United States Patent
Bonod et al.

(10) Patent No.: US 10,481,420 B2
(45) Date of Patent: Nov. 19, 2019

(54) OPTICAL DETECTOR AND FILTER EMPLOYING RESONANT NANO-/MICROPARTICLES

(71) Applicants: Centre National de la Recherche Scientifique, Paris (FR); Université d'Aix-Marseille, Marseilles (FR); Ecole Centrale de Marseille, Marseilles (FR)

(72) Inventors: Nicolas Bonod, La Londe les Maures (FR); Marco Abbarchi, Marseilles (FR); Thomas Michael Wood, Marseilles (FR)

(73) Assignees: CENTRE NATIONAL DE LA RECHERCHE SCIENTIFIQUE, Paris (FR); UNIVERSITÉ D'AIX-MARSEILLE, Marseilles (FR); ECOLE CENTRALE DE MARSEILLE, Marseilles (FR)

( * ) Notice: Subject to any disclaimer, the term of this patent is extended or adjusted under 35 U.S.C. 154(b) by 124 days.

(21) Appl. No.: 15/746,350

(22) PCT Filed: Jul. 20, 2016

(86) PCT No.: PCT/EP2016/067341
§ 371 (c)(1),
(2) Date: Jan. 19, 2018

(87) PCT Pub. No.: WO2017/013189
PCT Pub. Date: Jan. 26, 2017

(65) Prior Publication Data
US 2018/0217406 A1 Aug. 2, 2018

(30) Foreign Application Priority Data
Jul. 20, 2015 (FR) .................................... 15 56864

(51) Int. Cl.
*G02F 1/015* (2006.01)
*G02B 5/20* (2006.01)
*G02F 1/01* (2006.01)

(52) U.S. Cl.
CPC ............... *G02F 1/015* (2013.01); *G02B 5/20* (2013.01); *G02F 1/0126* (2013.01); *G02F 2202/36* (2013.01)

(58) Field of Classification Search
CPC ......... G02B 5/20; G02F 1/0126; G02F 1/015; G02F 2202/36
(Continued)

(56) References Cited

U.S. PATENT DOCUMENTS 6,576,352 B2 * 6/2003 Hirai ..................... G02B 5/20
257/98

FOREIGN PATENT DOCUMENTS

WO 2004053938 A2 6/2004
WO 2013062795 A1 5/2013

OTHER PUBLICATIONS

M. Abbarchi et al., "Wafer Scale Formation of Monocyrstalline Silicon-Based Mie Resonators via Silicon-on-Insulator Dewetting," ACS Nano, vol. 8, No. 11, 2014, pp. 11181-11190.
(Continued)

*Primary Examiner* — Que Tan Le
(74) *Attorney, Agent, or Firm* — Baker & Hostetler LLP

(57) ABSTRACT

In the field of photonic and opto-electronic components, an optical filter comprises a plurality of semi-conducting nano-/microparticles, exhibiting properties of electromagnetic resonance in the optical and near-infrared domain, arranged on a plane, characterized in that it furthermore comprises a layer with electrically adjustable optical index disposed on the surface formed by said nano-/microparticles and said plane; a first electrically insulating layer disposed on said (Continued)

layer with electrically adjustable optical index and an electrode disposed on said first electrically insulating layer.

23 Claims, 11 Drawing Sheets

(58) Field of Classification Search
USPC .......................................................... 250/226
See application file for complete search history.

(56) References Cited

OTHER PUBLICATIONS

J. Sautter et al., "Active Tuning of All-Dielectric Metasurfaces," ACS Nano, vol. 9, No. 4, 2015, pp. 4308-4315.

* cited by examiner

A

B

OPTICAL DETECTOR AND FILTER EMPLOYING RESONANT NANO-/MICROPARTICLES

CROSS-REFERENCE TO RELATED APPLICATIONS

This application is a National Stage of International patent application PCT/EP2016/067341, filed on Jul 20, 2016, which claims priority to foreign French patent application No. FR 1556864, filed on Jul 20, 2015, the disclosures of which are incorporated by reference in their entirety.

FIELD OF THE INVENTION

The invention relates to photonic and opto-electronic components and more particularly to an optical filter and detector based on nano-/microparticles.

BACKGROUND

Color imaging systems require filters disposed on matrices of sensors. These filters are typically absorbent filters which transmit one or more defined wavelengths. They are generally fabricated using dyes: the absorption of incident light is performed by the molecules of which the dyes are composed. This procedure for filtering light comprises several drawbacks: the filtering capacity is subject to aging and the materials used are not compatible with methods for fabricating CMOS light sensors.

Abbarchi et al. (Abbarchi, M., Naffouti, M., Vial, B., Benkouider, A., Lermusiaux, L., Favre, L., . . . & Bonod, N., 2014, Wafer Scale Formation of Monocrystalline Silicon-Based Mie Resonators via Silicon-on-Insulator Dewetting. ACS nano, 8(11), 11181-11190) have disclosed a procedure for fabricating a filter based on the resonance of semi-conducting nano-/microparticles, making it possible to effectively scatter light incident on the surface of a component by electromagnetic resonance in the material of the nano-/microparticle. Their resonant frequencies depend on the size and on the material used. To produce these resonators, Abbarchi et al. use a silicon on insulator substrate on which a germanium layer can be deposited. Controlled pressure and temperature conditions induce dewetting of the semi-conducting layer(s) on the layer of $SiO_2$. The "droplets" of semi-conductor (silicon and/or germanium) form nano-/microparticles on the surface of the insulator. This procedure exhibits the benefit of being compatible with CMOS fabrication criteria since it does not use, in particular, any metal, in contradistinction to the procedures using microstructures implementing surface plasmons. On the other hand, the disclosed procedure does not make it possible to control a posteriori the resonant frequency of the fabricated nano-/microparticles since the size and the material of these particles are fixed during fabrication.

The invention also relates to a photodetector. Imaging systems generally comprise a matrix of photodetectors, for example of CMOS or p-n junction type, the spectral band of each of whose photodetectors is fixed. Color imaging requires independent detection of several spectral bands: photodetectors of one and the same matrix must then comprise filters of different spectral bands. The photodetectors produced in this manner are not tunable a posteriori and their fabrication requires additional technological steps which are not compatible with CMOS fabrication criteria.

SUMMARY OF THE INVENTION

The invention is aimed at overcoming, completely or partially, at least one of the aforementioned drawbacks of the prior art.

A subject of the invention making it possible to achieve this aim is an optical filter comprising:
- a plurality of semi-conducting nano-/microparticles, exhibiting properties of electromagnetic resonance in the optical and near-infrared domain, arranged on a plane, characterized in that it furthermore comprises:
- a layer with electrically adjustable optical index disposed on the surface formed by said nano-/microparticles and said plane;
- a first electrically insulating layer disposed on said layer with electrically adjustable optical index and
- an electrode disposed on said first electrically insulating layer.

Advantageously, the filter comprises a second electrically insulating layer a face of which coincides with said plane, said second electrically insulating layer being in contact with said nano-/microparticles and the layer with electrically adjustable optical index.

Advantageously, at least one said nano-/microparticle of said filter comprises a semi-conducting core and a semi-conducting shell whose electrical properties are different and suitable for forming at least one junction chosen from among an anisotype homojunction, an isotype heterojunction and an anisotype heterojunction.

Advantageously, the filter comprises at least one shell of electrically insulating material in which at least one said nano-/microparticle is surrounded, at least partially, by a said shell of electrically insulating material.

Advantageously, at least one material of said layer with electrically adjustable optical index of said filter is an organic material.

Advantageously, the material of said layer with electrically adjustable optical index of said filter is chosen at least from among poly(3,4-ethylenedioxythiophene), sodium polystyrene sulfonate, indium-tin oxide, zinc-aluminum oxide, poly(4,4-dioctylcyclopentadithiophene), poly(methyl methacrylate) and networks of carbon nanotubes.

Advantageously, the size and the material of said nano-/microparticles of said filter are suitable for allowing a resonance of said nano-/microparticles for excitation wavelengths of between 300 nm and 2.5 µm.

Advantageously, the filter comprises a first electrical circuit connected on the one hand to a ground and on the other hand to said electrode, suitable for the polarization of said layer with electrically adjustable optical index.

Advantageously, the optical index of the material of said second electrically insulating layer is strictly less than the optical index of the material of said nano-/microparticles and said nano-/microparticles are substantially hemispherical, the plane part of the hemispheres formed by said nano-/microparticles coinciding with said plane.

Another subject of the invention is a matrix of said filters.

Advantageously, at least two said first circuits of the matrix of filters are connected so as to impose the same potential between said ground and each said electrode.

Advantageously, at least one said first electrical circuit of said matrix of optical filters is suitable for imposing a potential independent of said other first electrical circuits, on at least one said electrode.

Another subject of the invention is a photodetector with p-n junction, comprising a filter disposed on a layer chosen from among an n-doped layer and a p-doped layer of said p-n junction.

Advantageously, the photodetector comprises a said optical filter, the material of whose said layer with electrically adjustable optical index is conducting.

Advantageously, the photodetector comprises a second electrical circuit, two of whose terminals are connected to said layer with electrically adjustable index, said second electrical circuit being suitable for detecting variations of electric current at said terminals.

Another subject of the invention is a matrix of said photodetectors.

Advantageously, at least two said first circuits of said matrix of photodetectors are connected so as to impose the same potential between said ground and each said electrode.

Advantageously, at least one said first electrical circuit of said matrix of photodetectors is suitable for imposing a potential independent of said other first electrical circuits, on at least one said electrode.

Another subject of the invention is a method for the fabrication of an optical filter, of a photodetector, of a matrix of optical filters and/or of a matrix of photodetectors comprising at least the following steps:
a) dewetting of at least one semi-conducting material layer previously deposited on a said second electrically insulating layer;
b) deposition of a said layer with electrically adjustable optical index on said semi-conducting and insulating materials.

Advantageously, the method comprises an initial step consisting in etching patterns on said layer of at least one said semi-conducting material, said patterns spatially controlling the formation of said nano-/microparticles during step a).

Advantageously, in the method, at least one said semi-conducting material layer is etched with a focused ion probe.

Advantageously, the method comprises a step consisting in etching at least said layer with electrically adjustable index so as to spatially define said optical filter(s), photodetector(s), matrix(matrices) of optical filters and/or of a matrix(matrices) of photodetectors.

Another subject of the invention is a method of optical filtering by an optical filter, a photodetector, a matrix of optical filters and/or a matrix of photodetectors, said method comprising at least one step consisting in adjusting the resonance wavelength of said nano-/microparticles by driving the potential on the terminal of said electrode.

The following description exhibits several exemplary embodiments of the device of the invention: these examples do not limit the scope of the invention. These exemplary embodiments exhibit at one and the same time the essential characteristics of the invention as well as additional characteristics related to the embodiments considered. For the sake of clarity, the same elements will bear the same labels in the various figures.

By "nanoparticle" is meant a particle at least the smallest of whose dimensions is nanometric, that is to say lies between 0.1 nm and 100 nm.

By "microparticle" is meant a particle at least the smallest of whose dimensions is micrometric, that is to say lies between 0.1 μm and 100 μm.

By "pixel" is meant at least one element chosen from among a filter and a photodetector of a matrix of said element.

BRIEF DESCRIPTION OF THE DRAWINGS

The invention will be better understood and other advantages, details and characteristics thereof will become apparent in the course of the explanatory description which follows, given by way of example with reference to the appended drawings in which.

DETAILED DESCRIPTION

Figure 1:
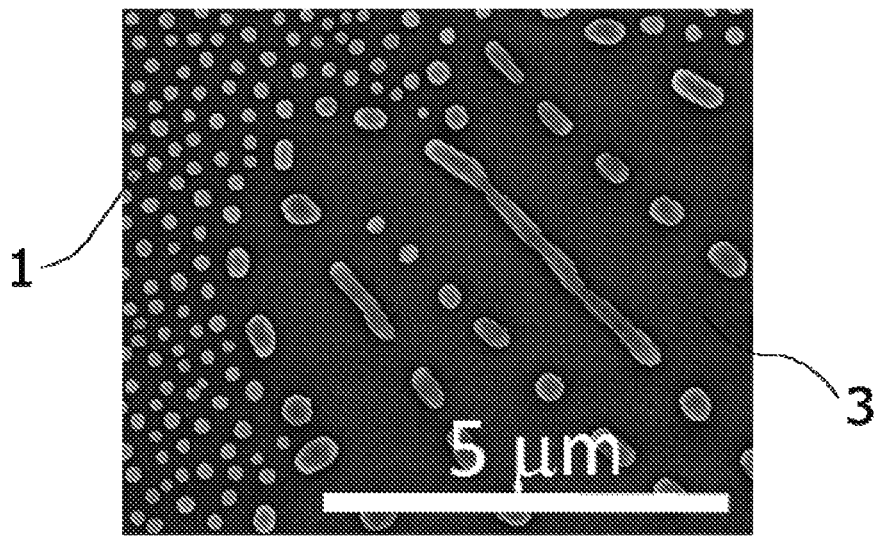
FIG. 1 is a photograph obtained by means of a scanning electron microscope of a silicon on insulator wafer, viewed from above, after the formation of nano-/microparticles.

FIG. 1 is a photograph obtained by means of a scanning electron microscope of a silicon on insulator (SOI) wafer, viewed from above, after the formation of nano-/microparticles 1. Advantageously, the procedure described by Abbarchi et al. can be used to produce the network of nano-/microparticles illustrated by FIG. 1. A silicon on insulator wafer is used. After cleaning of the SOI wafers, the layer of native oxide of the silicon can be eliminated by wet etching. An epitaxial germanium layer can be deposited on the silicon layer of the wafer (it is for example possible to deposit 18 germanium monolayers). The sample is baked, for example between 750 and 880° C. under a high vacuum, for example between $10^{-8}$ and $10^{-10}$ Torr, for 30 to 120 minutes for example. These conditions lead to the dewetting of the semi-conducting layers on the insulator 3. In FIG. 1, the SOI wafer used is characterized by an insulator ($SiO_2$) thickness of 25 nm and a silicon thickness of 12 nm before dewetting. The photograph of FIG. 1 illustrates the formation of nano-/microparticles 1 formed by dewetting of the silicon layer and of the germanium layer by this method.

Other procedures for producing semi-conducting nano-/microparticles 1 can be used. For example, Proust et al. (Proust, J., Bedu, F., Chenot, S., Soumahoro, I., Ozerov, I., Gallas, B., . . . & Bonod, N., 2015, Chemical Alkaline Etching of Silicon Mie Particles, Advanced Optical Materials) disclose a selective chemical lithography procedure for thick layers (for example 100 nm) of silicon on insulator. It is also possible to use colloidal self-assembly (Garin, M., Fenollosa, R., Alcubilla, R., Shi, L., Marsal, L. F., & Meseguer, F., 2014, All-silicon spherical-Mie-resonator photodiode with spectral response in the infrared region. Nature communications, 5), nanometric printing combined with ion etching (Spinelli, P., Verschuuren, M. A., & Polman, A., 2012, Broadband omnidirectional antireflection coating based on subwavelength surface Mie resonators, Nature communications, 3, 692) or laser ablation (Kuznetsov, A. I., Miroshnichenko, A. E., Fu, Y. H., Zhang, J., & Luk'yanchuk, B., 2012, Magnetic light. Scientific reports, 2).

Figure 2:
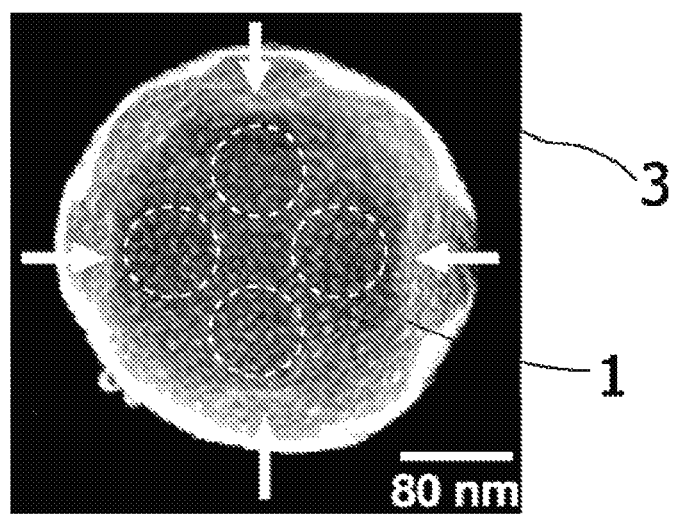
FIG. 2 is a photograph obtained by means of a high-resolution scanning electron microscope, viewed from above, of a nano-/microparticle.

FIG. 2 is a photograph obtained by means of a high-resolution scanning electron microscope, viewed from above, of a nano-/microparticle 1. This nano-/microparticle 1 is produced according to the procedure described in FIG. 1. Some of the faces corresponding to the crystallographic planes (311) are indicated by the dashed white circles and by the white arrows. Generally, the procedure described in FIG. 1 and the procedure described by Proust et al. advantageously allow the fabrication of nano-/microparticles 1 whose structure is crystalline. In particular, a nano-/microparticle 1 comprising an atomically smooth surface makes it possible to minimize the electronic surface states. Defects on the surface of these nano-/microparticles can give rise to appreciable losses of charge, for example through recombinations. As a variant, the nano-/microparticles 1 can be in produced with a dielectric material.

Figure 3:
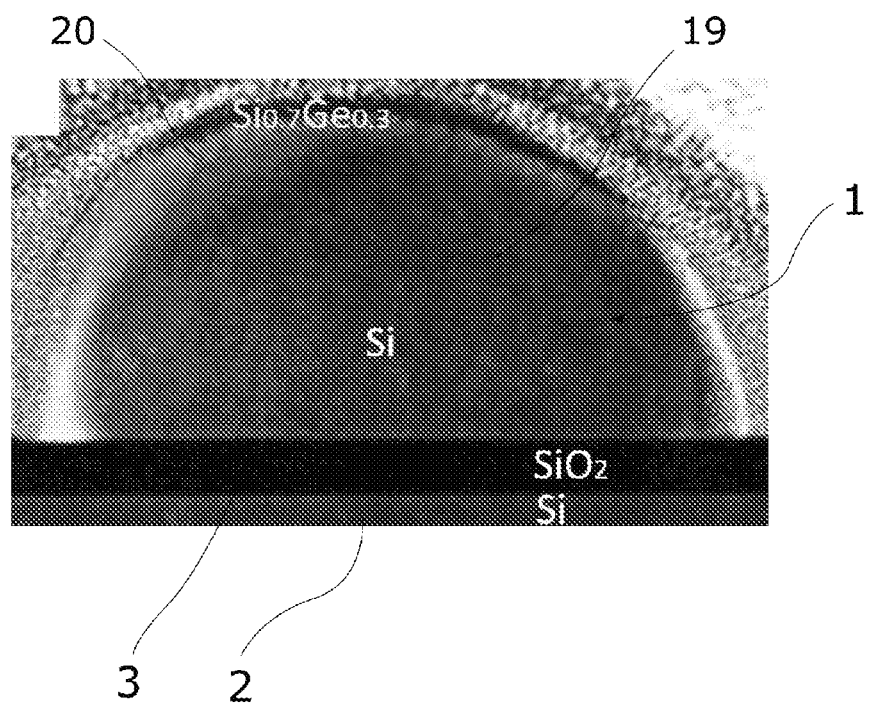
FIG. 3 is a photograph obtained by means of a transmission electron microscope of the cross section of a nano-/microparticle.

FIG. 3 is a photograph obtained by means of a transmission electron microscope of the cross section of a nano-/microparticle 1. This nano-/microparticle is produced according to the procedure described in FIG. 1. The semi-conducting core 19 of the particle 1 is made of silicon while its semi-conducting shell 20 is made of alloy $Si_{0.7}Ge_{0.3}$. The formation of a shell is possible by virtue of the superposition of the silicon and germanium layers prior to dewetting. More generally, the nano-microparticles 1 of the embodiments of the invention can comprise a semi-conducting core 19 and a semi-conducting shell 20 whose electrical properties are different and suitable for forming at least one electrical junction chosen from among an anisotype homojunction, an isotype heterojunction and an anisotype heterojunction.

Figure 4:
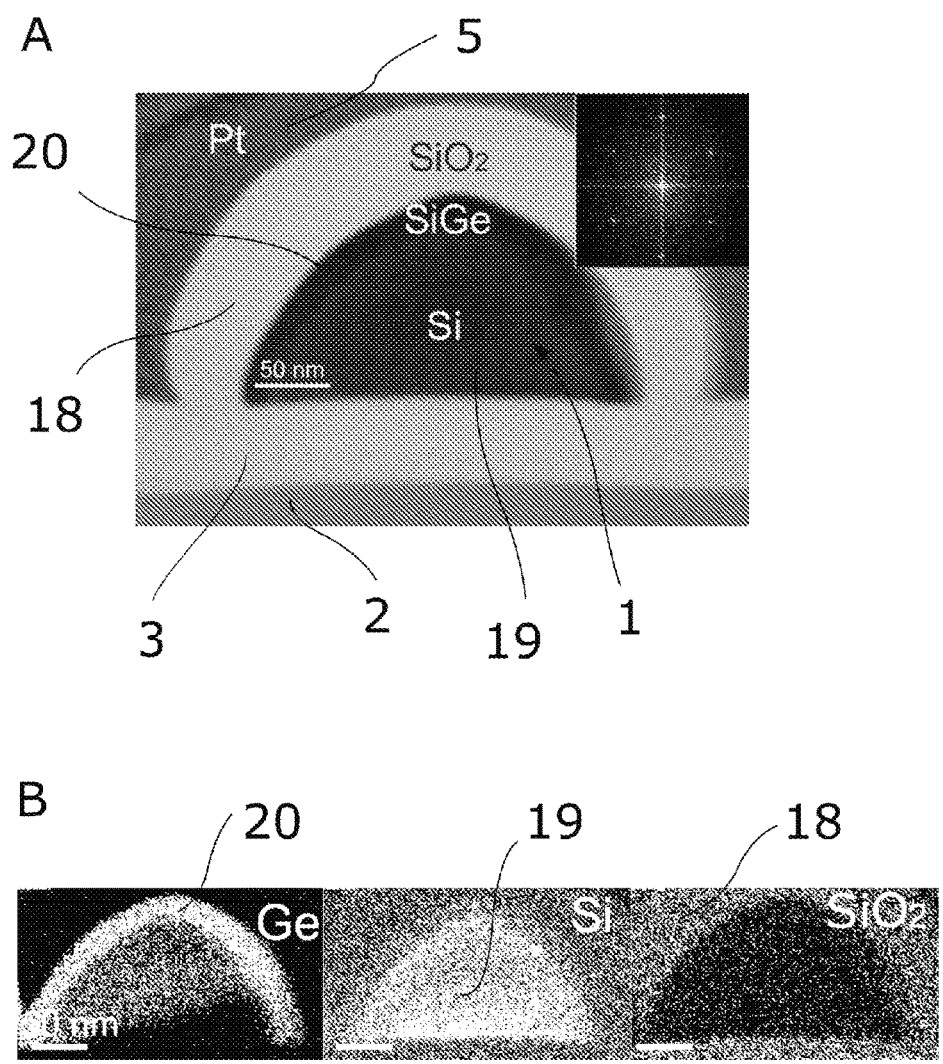
FIG. 4 is a photograph obtained by means of a transmission electron microscope of the cross section of a nano-/microparticle.

FIG. 4 illustrates the structure of a nano-microparticle 1. Panel A of FIG. 4 is a photograph obtained by means of a transmission electron microscope of the cross section of a nano-/microparticle 1. In this embodiment of the invention, the nano-/microparticle 1 comprises a semi-conducting core 19 made of silicon and a semi-conducting shell 20 made of a silicon and germanium alloy. The nano-/microparticle 1 is surrounded by insulating material, in this instance silicon dioxide: on its lower face by a second electrically insulating layer 3 and on its upper surface by a partial shell of electrically insulating material 18. In embodiments of the invention, comprising the embodiment described in FIG. 4, an MIS junction (the acronym standing for Metal Insulator Semiconductor) is produced: the material of the layer with electrically adjustable optical index 5 is platinum; it is metallic and conducting. The insulator is produced by the shell of electrically insulating material 18 made of silica and the semi-conductor is produced by the nano-/microparticle 1. The inset of FIG. 4 illustrates a fourrier transform performed by means of a photograph with atomic resolution (not shown) of the core 19. This Fourier transform confirms the crystallinity of the nano-/microparticles 1.

Panel B of FIG. 4 is a montage of three photographs of the nano-/microparticles 1, obtained by means of energy-dispersive analyses (EDX spectroscopy). From left to right, the lightest gray levels show respectively the presence of germanium, of silicon and of silicon dioxide.

Figure 5:
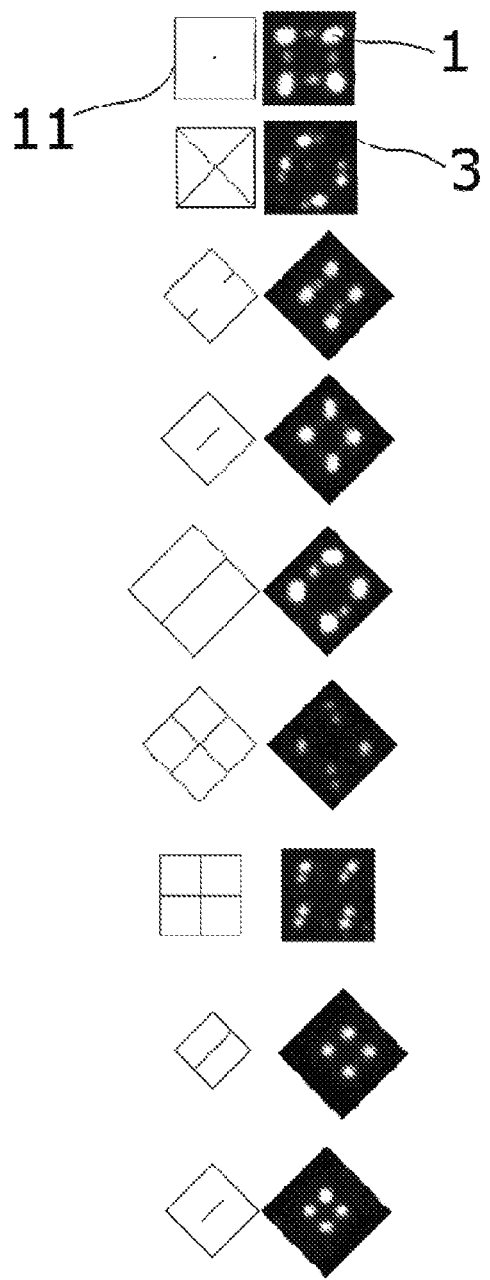
FIG. 5 illustrates the correspondence between various etching patterns and the spatial distribution of the nano-/microparticles on the insulator layer.

FIG. 5 illustrates the correspondence between various etching patterns 11 and the spatial distribution of the nano-/microparticle or particles 1 on the insulator layer 3. Various patterns can be etched on an SOI wafer before producing the nano-/microparticles using the procedure described in FIG. 1. These etchings can be produced by a focused ion probe (FIB, for example by using a dual-beam Tescan LYRA 1 XMH probe). The left-hand column presents patterns 11 used for the FIB etching. The right-hand column presents, to the same scale, dark-field optical microscopy images, wherein each side of the image represents 4 μm. The images of the right-hand column illustrate the spatial distribution of the nano-/microparticles 1 formed using the procedure described in FIG. 1 preceded by the etching of the corresponding patterns 11. The etching of patterns makes it possible to create in a controlled manner defects on the layer or the stack of semi-conductor layers before their dewetting. These defects make it possible to control the nucleation or the formation of instabilities of Rayleigh type and to arrive at the formation of the nano-/microstructures 1. The etching of various patterns makes it possible to produce assisted dewetting, as opposed to the spontaneous dewetting produced without etching.

Figure 6:
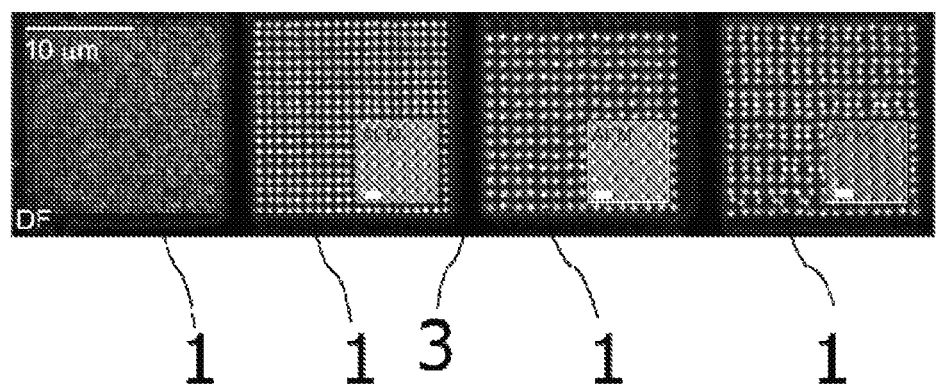
FIG. 6 is a montage composed of an optical microscopy image of networks of nano-/microparticles and of three AFM microscopy images indicating details of these networks.

FIG. 6 is a montage composed of an optical microscopy image of networks of nano-/microparticles 1 and of three AFM microscopy images, as insets, indicating details of these networks. The networks of particles 1 are produced by the procedure described in FIG. 5, comprising a step of etching of patterns 11 followed by a step of dewetting of the semi-conducting layer or layers. From left to right of the image, the spacing of the center-to-center gap between particles 1 of a network is respectively 500 nm, 750 nm and 1000 nm. The network on the right illustrates a bimodal distribution of the nano-/microparticles 1, alternating a spacing of 750 nm and of 1000 nm between the centers of the various nano-/microparticles 1 in the direction going from bottom to top of the image.

Figure 7:
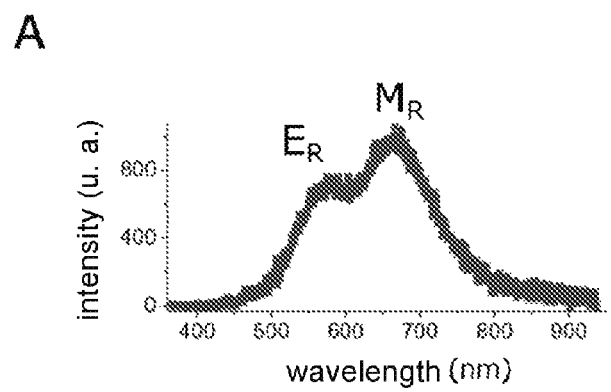
FIG. 7 illustrates the electromagnetic resonances of the nano-/microparticles.
Figure 7:
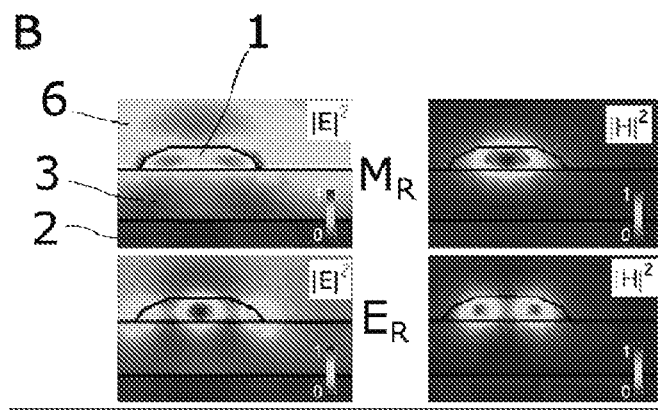

FIG. 7 illustrates the electromagnetic resonances of the nano-/microparticles 1. Panel A of FIG. 6 illustrates an example of the dark-field scattering spectrum of a single nanoparticle 1 produced according to the procedure described in FIG. 5. Two scattering resonances, $M_R$ and $E_R$ are visible. Panel B of FIG. 6 illustrates simulations carried out according to the finite element procedure of the electrical intensity $|E|^2$ and of the magnetic intensity $|B|^2$ in the neighborhood and in a nanoparticle 1. In the simulations presented, the width of the nanoparticle is 356 nm and its height is 65 nm. The simulations take into account a nanoparticle 1 disposed on an insulator layer 3 and surrounded over the remainder of its surface by air 6. Results of the simulations are illustrated for the $M_R$ mode of resonance (top images) and the $E_R$ mode of resonance (bottom images). The simulations according to the $E_R$ and $M_R$ modes are carried out by considering an excitation by a plane wave inclined by 70° with respect to the plane formed by the surface of the insulator layer and according to a rotation with respect to an axis included in the plane of the cross section illustrated. In the case of an $M_R$ mode resonance, the nanoparticle 1 exhibits two spatial maxima of intensity $|E|^2$ and a spatial maximum of intensity $|H|^2$ at its center. These characteristics indicate the dominance of a dipolar magnetic mode $M_R$. In the case of an $E_R$ mode resonance, the nanoparticle 1 exhibits a spatial maximum of intensity $|E|^2$ at its center and two spatial maxima of intensity $|H|^2$. These characteristics indicate the dominance of a dipolar electrical resonance mode.

Figure 8:
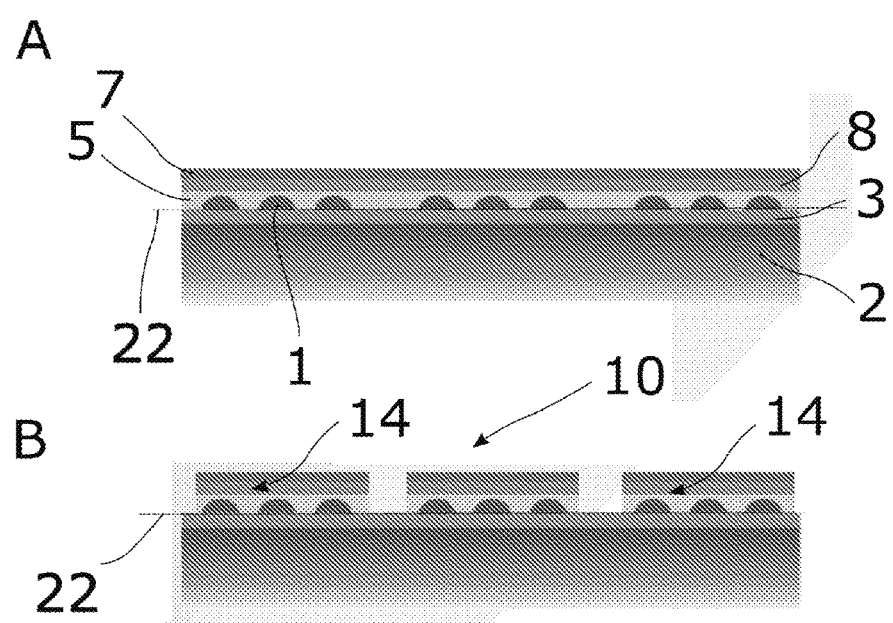
FIG. 8 schematically illustrates an optical filter according to an embodiment of the invention and a matrix of optical filters according to an embodiment of the invention.

FIG. 8 schematically illustrates an optical filter 14 according to an embodiment of the invention and a matrix 10 of optical filters 14 according to an embodiment of the invention. Panel A of FIG. 8 schematically illustrates a cross-sectional view of a filter 14 according to an embodiment of the invention, and panel B of FIG. 8 presents a matrix 10 of three filters 14 according to an embodiment of the invention. In panel A, a plurality of nano-/microparticles 1 are arranged on the surface of a (fictitious) plane 22. In an embodiment of the invention, the nano-/microparticles 1 are made from silicon, from germanium, of a silicon and germanium alloy, or more generally from semi-conducting material(s), or of one or more dielectric material(s) whose optical index is greater than 1.5 preferably than 2.5, and preferably greater than 3.

Advantageously, in the embodiment illustrated in FIG. 8, the filter comprises a second electrically insulating layer 3. The upper face of the layer 3 coincides with the plane 22. The layer 3 is then in contact with the nano-/microparticles 1. This layer 3 may be made of $SiO_2$ for example. Other types of insulating materials can be used. The second insulating layer 3 can be arranged on a substrate 2 which may advantageously comprise an optoelectronic transducer, such as a photodetector or a light-emitting diode. The nano-/microparticles 1 of the embodiment of the invention described in FIG. 8 can be fabricated using the method described by Abbarchi et al.

The surface formed by the plane 22 and the nano-/microparticles 1 is covered with a layer with electrically adjustable optical index 5. Advantageously, in an embodiment of the invention described previously comprising a second electrically insulating layer 3, the plane 22 coincides with one of the faces of the layer 3: the assembly formed by the layer 3 and by the nano-/microparticles 1 is covered with a layer with electrically adjustable optical index 5. In other embodiments of the invention, a face of a substrate can coincide with the plane 22; the layer with electrically adjustable optical index 5 then covers the surface formed by the upper face of the substrate and the nano-/microparticles 1. In both these cases, and generally, the plane 22 coincides with a layer whose electrical potential is electrically linked, directly or indirectly, to a potential which is substantially fixed and/or stationary with respect to the variations of the electrical potential which is imposed on the electrode 7, so as to fix an electric field which is controlled in the filter 14.

The material of this layer is considered to have an "electrically adjustable optical index" when the real part of its refractive index can be modified by varying an electric field or an electric current applied to the material. This property can originate from the injection of charge carriers, or other effects, such as for example the Kerr effect, the Pockels effect, electro-absorption or the Franz-Keldysh effect. Other effects can also be considered when using polymers such as electrostatic inflation and collapse or controlled scattering of ions within the polymer or polymers. In embodiments of the invention, the material or materials of this layer can be chosen from among indium-tin oxide (ITO), zinc-aluminum oxide, networks of carbon nanotubes, or an organic material such as poly(3,4-ethylenedioxythiophene) (PEDOT), poly(4,4-dioctylcyclopentadithiophene), sodium polystyrene sulfonate (PSS) and poly(methyl methacrylate) (PMMA). It is also possible to use a layer of liquid crystals associated with one or more layers of alignment polymers (for example polyvinyl acetate) to produce a layer with electrically adjustable optical index 5. A procedure for thermally adjusting the resonance of nano-/microparticles using such liquid crystals is for example presented in Sautter, J., Staude, I., Decker, M., Rusak, E., Neshev, D. N., Brener, I., & Kivshar, Y. S., 2015, Active Tuning of All-Dielectric Metasurfaces. This procedure exhibits the defects of requiring several layers in order to make it possible to initiate an appropriate alignment of the liquid crystals in the nematic phase and to allow adjustment over a very restricted range of wavelengths (substantially 100 nm in the near-infrared). Advantageously, at least one material of the layer with electrically adjustable optical index 5 is an organic material. Advantageously, the material of the layer 5 can be a mixture of PEDOT and of PSS. Generally, the material or materials of the layer with electrically adjustable optical index 5 are preferably solid: they may be for example amorphous or crystalline. Otherwise, they may for example comprise a liquid phase.

Various procedures can be used to deposit the layer with electrically adjustable optical index 5, such as cathodic sputtering for metallic materials, or centrifugal coating (also known as spin coating) for organic materials.

In this embodiment of the invention, the layer with electrically adjustable optical index 5 is substantially transparent.

The layer with electrically adjustable optical index 5 is covered by a first electrically insulating layer 8. This layer 8 can be made of $SiO_2$, for example by a plasma-enhanced chemical vapor deposition (PE-CVD) procedure, by rapid thermal oxidation (RTP) or more generally by other oxidation procedures if the layer with electrically adjustable optical index 5 is compatible therewith.

The first insulating layer 8 is covered by a layer of electrically conducting material, i.e. an electrode 7. In the various embodiments of the invention, the electrode is substantially transparent. It may for example be made of gold by evaporation, in the case of coverage of wide surfaces, or by gas injection assisted by FIB for making precise circuitries. The electrode 7 can also be made of ITO.

An etching can be performed on the previously described filter 14, for example by FIB or by electron beam (E-beam), on the various layers situated on the second insulating layer 3. This etching can make it possible to spatially delimit a plurality of filters 14, i.e. various pixels, and thus to form a matrix 10 of filters 14.

Panel B of FIG. 8 presents a matrix 10 of three filters 14, (or three pixels), after an etching for defining the pixels, as is described in the previous paragraph.

Figure 9:
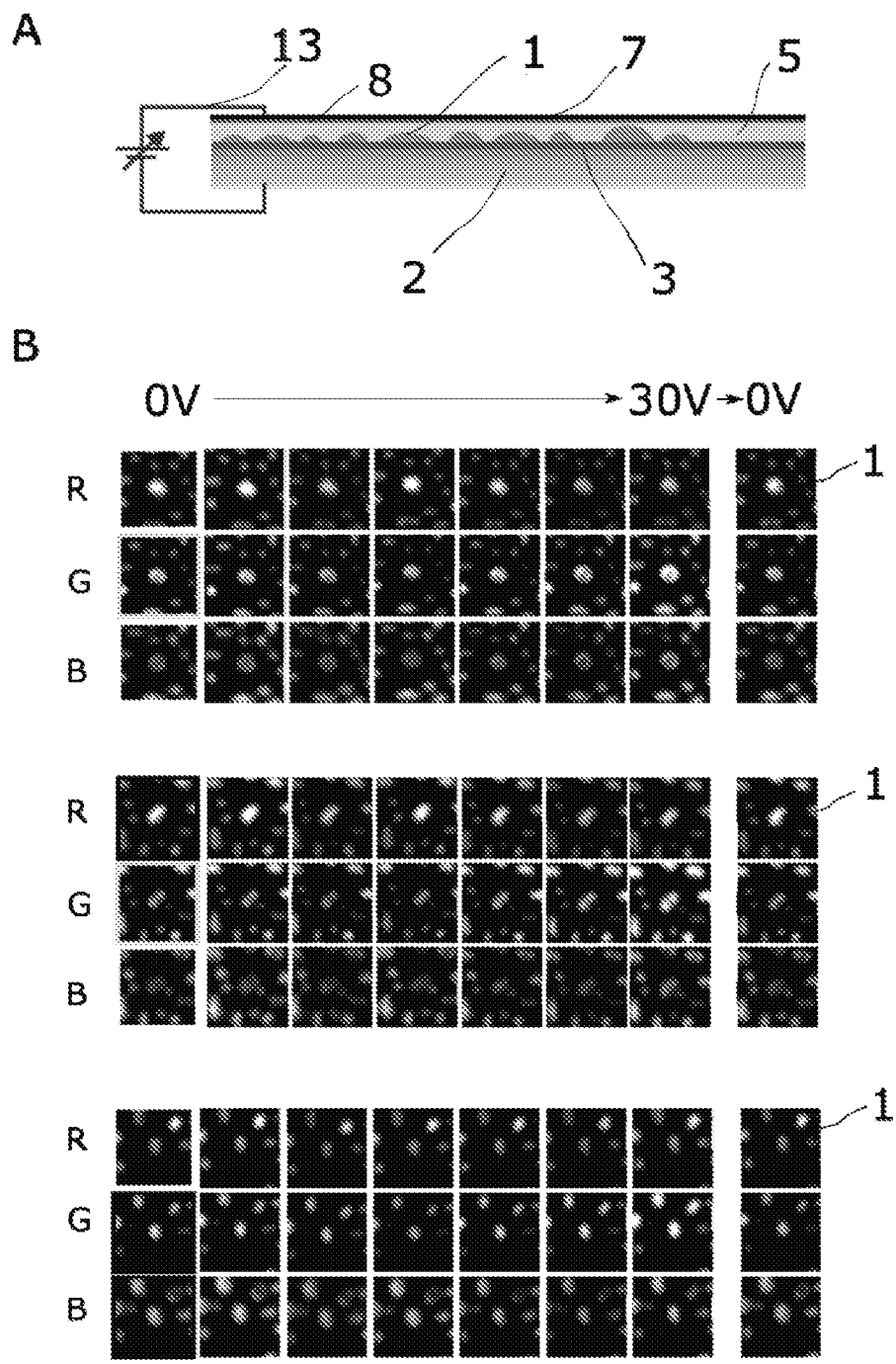
FIG. 9 illustrates the adjusting of the resonant frequency of the nano-/microparticles by imposing a potential on the layer with electrically adjustable optical index.

FIG. 9 illustrates the adjustment of the resonant frequency of the nano-/microparticles 1 by imposing a potential on the layer with electrically adjustable optical index 5. Panel A of FIG. 9 illustrates an embodiment of the invention in which a first circuit 13 is connected on the one hand to the ground (substrate 2 in this embodiment) and on the other hand to the electrode 7 of the device described in panel A of FIG. 7. This first circuit makes it possible to impose a controlled potential difference between the two faces, upper and lower, of the layer with electrically adjustable optical index 5. In this embodiment of the invention, the nano-/microparticles 1 have different sizes and the layer with electrically adjustable optical index 5 is a mixture of PEDOT and of PSS.

Panel B of FIG. 9 illustrates dark-field scattering photographs of the nano-/microparticles 1 for various potentials applied by the first circuit 13. Each photograph illustrates a field 2 μm by 2 μm. Three series of images are illustrated. Each of them exhibits, from top to bottom channels of different colors, and from left to right, different potentials applied to the layer with electrically adjustable optical index 5. The color channels are red (R), green (G) and blue (B). From left to right, the images correspond to a sequence of imposed potentials ranging from 0 to 30 V and then to a potential of 0 V.

Observation of the luminous intensity of channel R of the first series makes it possible for example to measure a decrease in the luminous intensity scattered by the central nano-/microparticle 1 when potentials of 0 V to 30 V are applied, and then an increase in this intensity when the applied potential returns to 0 V. In a complementary manner, observation of the luminous intensity of channel G of the first series makes it possible to measure an increase in the intensity of scattering of the central nano-/microparticle 1 when potentials of 0 V to 30 V are applied, and then a decrease in this intensity when the applied potential returns to 0 V. These variations are manifested, on considering the three color channels, through a variation of the observed color of the central nano-/microparticle 1: from 0 V to 30 V, the color emitted by the nano-/microparticle 1 varies from a red dominant to a green dominant and returns to a red dominant when the 0 V potential is imposed. The nano-/microparticles 1 of the other two series exhibit similar behaviors. This exemplary embodiment of the invention makes it possible to illustrate the adjustment of the resonant frequency of different nano-/microparticles 1 in the visible part of the spectrum by the application of a variable electrical potential by the first circuit 13. In other embodiments of the invention, the adjustment of the resonance of the nano-/microparticles 1 can be performed for near-infrared wavelengths, for example for wavelengths included in a range from 800 nm to 2.5 μm.

The invention also relates to photodetectors 15 based on such filters 14, harnessing the selective and tunable character of the luminous spectrum of the filters 14. A filter 14 according to the invention can be disposed on a conventional photodetector, for example a pixel of a CCD or CMOS matrix sensor, or itself serve as photodetector.

Figure 10:
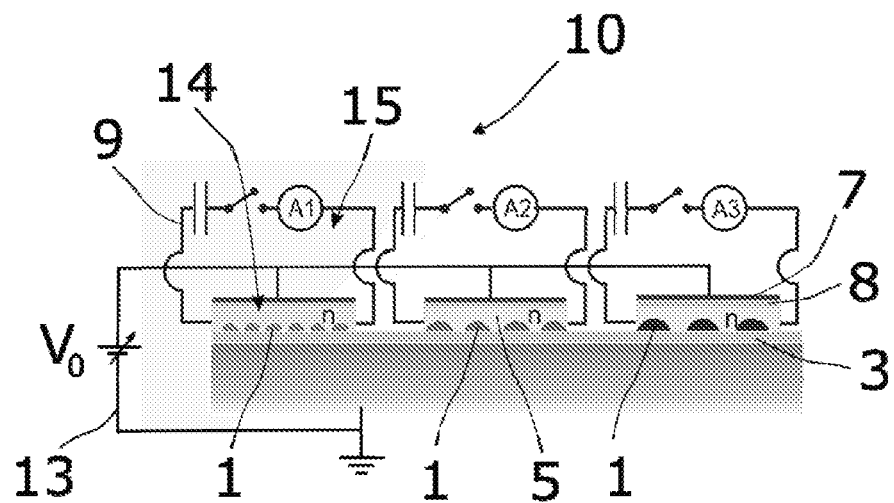
FIG. 10 schematically illustrates a matrix of filters and of photodetectors according to embodiments of the invention.

FIG. 10 schematically illustrates a matrix 10 of photodetectors 15 produced by means of filters 14 according to embodiments of the invention. The matrix of filters of the embodiment illustrated in FIG. 10 can be fabricated by the procedures presented during the description of the previous figures. In an embodiment of the invention, each filter 14 comprises a plurality of nano-/microparticles 1. The nano-/microparticles 1 of one and the same filter 14 are all substantially of the same size, and are of different sizes according to the filters 14 of the matrix 10. Thus, the color between filters 14 of a matrix 10 can vary as a function of a combination of two independent factors: the size of the nano-/microparticles 1 and the optical index of the layer 5 of each filter, imposed by the polarization or polarizations of said layers 5.

The material of the layer with electrically adjustable optical index 5, of optical index denoted n, may be conducting or semi-conducting. It may be suitable for creating, in association with nano-/microparticles 1, charges during the electromagnetic resonance of said nano-/microparticles 1 at their interface. It is for example possible to use a PSS-PEDOT mixture for this embodiment of the invention: a variation of electromagnetic field in the nano-/microparticles 1 allows the formation of the charges in the device and their transport to, for example, a second electrical circuit 9.

These charges can also be created at the junction formed between the semi-conductor of a particle 1 and by the electrical contact formed by the material of the layer with electrically adjustable optical index 5. In embodiments of the invention, the junction between the nano-/microparticles 1 and the layer with electrically adjustable optical index 5 can be of metal-semi-conductor type (behavior of a Schottky barrier), of p-n type or of metal-insulator-semi-conductor (MIS) type.

The junctions of p-n types can be produced using nano-/microparticles fabricated according to the procedure described in Abbarchi et al. and by using for example before dewetting a silicon layer on which is disposed an epitaxial layer of germanium doped for example with antimony and/or boron. After dewetting, the nano-microparticles 1 formed can comprise a semi-conducting shell 20 of composition $Si_xGe_{(1-x)}$ (x being the proportion of Silicon) around the core of the particle comprising silicon. An example of such a nano-/microparticle is illustrated in FIG. 2.

In other embodiments of the invention, Schottky-type junctions can be produced at the interface between the particles 1 and the layer 5. FIG. 4 describes for example a junction of MIS type between the layer with electrically adjustable optical index 5 and the nano-/microparticle 1. The thickness of the shell of electrically insulating material 18 can be reduced so as to be less than 10 nm and preferably than 5 nm so as to make it possible to transfer charges through the insulating material by tunnel effect. The reduction in this thickness can be produced by isotropic etching of silica for example.

Figure 11:
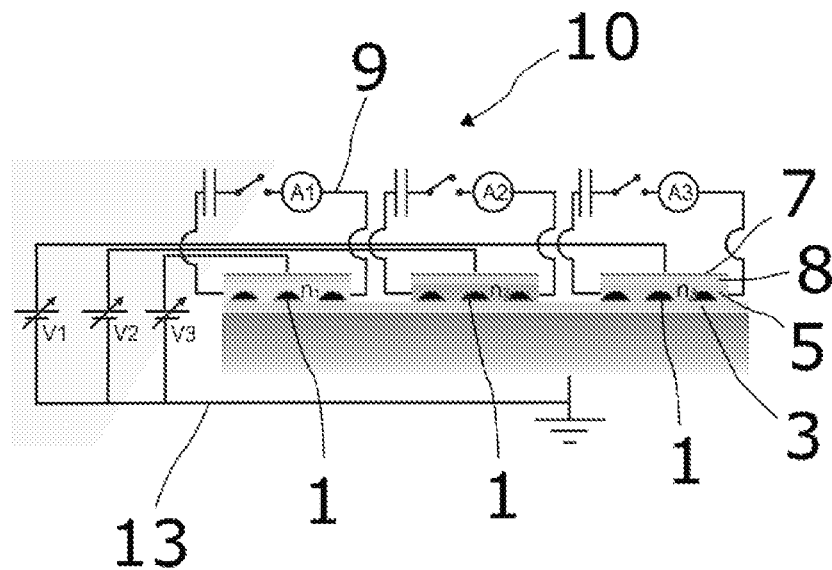
FIG. 11 schematically illustrates a matrix of filters and of photodetectors according to embodiments of the invention.

FIG. 11 illustrates a matrix of three photodetectors 15, each detector comprising a filter 14 linked to a second electrical circuit 9 by the layer with electrically adjustable optical index 5, in the case of the embodiment described previously. The charges created by the resonance of the nano-/microparticles 1 may be detected by a second electrical circuit. This detection may be carried out in two steps. A first step can consist in illuminating the nano-/microparticles 1, giving rise to the charging of a capacitor when the switch of the second circuit 9 is open. A second step can consist in closing the switch of the second circuit and of the reading of the charge accumulated in the capacitor by an ammeter (A1, A2 or A3 in FIG. 9) or an oscilloscope for example, by charge integration for example.

In an embodiment of the invention, a first electrical circuit 13 can link at least two filters 14 and/or two photodetectors 15 in such a way as to impose the same potential $V_0$ between an electrical ground and the electrodes 7 of each filter 14 and/or detector 15 linked to the first circuit. Advantageously, the first circuit can be linked to the whole set of filters 14 and/or photodetectors 15 of the matrix. These examples make it possible to work at a constant polarization of the layer with electrically adjustable optical index 5 of some or of the whole set of filters and/or of photodetectors.

FIG. 11 schematically illustrates a matrix 10 of filters 14 and of photodetectors 15 according to embodiments of the invention. In an embodiment of the invention, some of the nano-/microparticles 1, or advantageously the whole set of nano-/microparticles 1, have the same size. These nano-/microparticles 1 are illustrated by black lobes in FIG. 10. In this embodiment of the invention, each of the filters 14 is linked to a first electrical circuit 13 by the electrode 7 of the filter. Each of the filters can be polarized by imposing a potential which is independent of the others on the electrode 7 of a filter: in FIG. 10, the potential V1 is imposed on the electrode of the right-hand filter, the potential V2 is imposed on the electrode of the middle filter and the potential V3 is imposed on the electrode of the left-hand filter. Respectively, the optical indices of the filters, $n_1$, $n_2$ and $n_3$, are different (the material of the layer with electrically adjustable optical index 5 may be the same). As described in FIG. 8, polarization of the filter makes it possible to adjust the resonant frequency of the filter for given nano-/microparticles. In the case of FIG. 11, the nano-/microparticles are of substantially equal sizes and each of the filters 14 can be adjusted to different resonant frequencies by applying different potentials. Applying different potentials makes it possible to produce filters of different colors. In other embodiments of the invention, a first electrical circuit 13 can be linked to some of the filters 14 of the matrix in such a way as to impose a potential which is independent of the other filters 14 of the matrix.

The embodiment of the invention illustrated in FIG. 11 comprises three photodetectors, each photodetector comprising a filter 14 and a second circuit 9. As described previously, the imposition of different potentials by the first circuits 13 makes it possible to obtain filters 14 of different colors. It is then possible to detect the luminous intensity for different colors by imposing different potentials $V_1$ $V_2$ and $V_3$ by means of the first circuits, and by detecting the charges produced by a luminous exposure with the second circuits 9. In another embodiment of the invention, a first electrical circuit 13 can be linked to some of the photodetectors 15 of the matrix 10 so as to impose a potential which is independent of the other photodetectors 15 of the matrix.

In an embodiment of the invention, an incident light can be filtered by imposing a controlled potential on one or more filters included in photodetectors. During the filtering, the potential or potentials imposed on electrodes 7 of a matrix 10 are driven by a processing unit in such a way as to filter the light at the resonant frequency or frequencies parametrized by a user.

Figure 12:
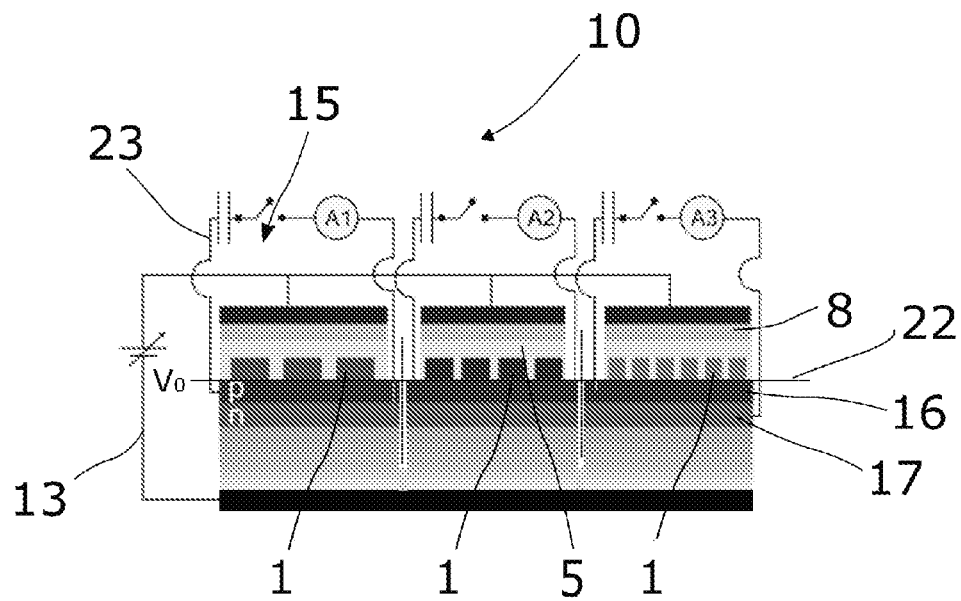
FIG. 12 illustrates a matrix of three photodetectors according to embodiments of the invention.

FIG. 12 illustrates a matrix of three photodetectors 15 according to embodiments of the invention. In these embodiments of the invention, the various filters 14 do not comprise any second electrically insulating layer 3; they are fabricated according to the method described in Proust et al. Each of the filters 14 is included in a photodetector with p-n junction: the plane 22 separates in this embodiment of the invention a filter 14 from a p-doped semi-conducting material layer 16 of the photodiode with p-n junction. More generally, each of the filters 14 can be disposed on a p-doped layer 16 or on an n-doped layer 17 of the p-n junction. In a similar manner to the circuit described in FIG. 10, a first electrical circuit 13 can link at least two filters 14 and/or two photodetectors 15 in such a way as to impose the same potential $V_0$ between an electrical ground and the electrodes 7 of each filter 14 and/or detector 15 linked to the first circuit. Advantageously, the first circuit can be linked to the whole set of filters 14 and/or photodetectors 15 of the matrix.

In this embodiment of the invention, a terminal of a third circuit 23 is connected to the p-doped layer 16 of a p-n junction of a photodetector and another terminal of a third circuit 23 is connected to the n-doped layer 17 of a p-n junction of the same photodetector. The third circuit 23 allows the recovery of the charges created during an illumination of the p-n junction transmitted by the filter 14. The vertical dots separating two pixels show diagrammatically an electrical separation between the various p-n junctions corresponding to the various pixels of the matrix.

The embodiment of the invention illustrated in FIG. 12, each of the pixels of which is polarized by $V_0$, is typically suitable for a matrix in which the difference in color of the filters is due in part to the presence of nano-/microparticles 1 of substantially the same size for a pixel considered but of different sizes for two pixels considered of different colors.

Figure 13:
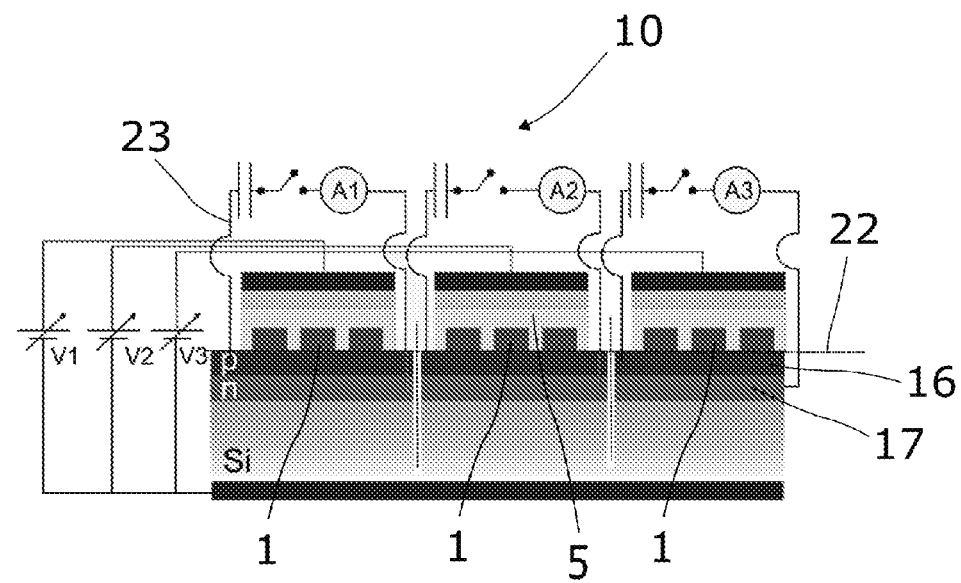
FIG. 13 illustrates a matrix of three photodetectors according to embodiments of the invention.

FIG. 13 illustrates a matrix of three photodetectors 15 according to embodiments of the invention. In these embodiments of the invention, the various filters 14 do not comprise any second electrically insulating layer 3; they are fabricated according to the method described in Proust et al. Each of the filters 14 is included in a photodetector with p-n junction: the plane 22 separates in this embodiment of the invention a filter 14 from a p-doped semi-conducting material layer 16 of the photodiode with p-n junction. More generally, each of the filters 14 can be disposed on a p-doped layer 16 or on an n-doped layer 17 of the p-n junction. In a similar manner to the circuit described in FIG. 11, each of the filters 14 is linked to a first electrical circuit 13 by the electrode 7 of the filter. Each of the filters can be polarized by imposing a potential which is independent of the others on the electrode 7 of a filter: in FIG. 13, the potential $V_1$ is imposed on the electrode of the left-hand filter, the potential $V_2$ is imposed on the electrode of the middle filter and the potential $V_3$ is imposed on the electrode of the right-hand filter. Respectively, the optical indices of the filters, $n_1$, $n_2$ and $n_3$, are different. As described in FIG. 8, polarization of the filter makes it possible to adjust the resonant frequency of the filter for given nano-/microparticles. In the case of FIG. 13, the nano-/microparticles are of substantially equal sizes and each of the filters 14 can be adjusted to different resonant frequencies by applying different potentials. Applying different potentials makes it possible to produce filters of different colors. In other embodiments of the invention, a first electrical circuit 13 can be linked to some of the filters 14 of the matrix in such a way as to impose a potential which is independent of the other filters 14 of the matrix.

In this embodiment of the invention, a terminal of a third circuit 23 is connected to the p-doped layer 16 of a p-n junction of a photodetector and another terminal of a third circuit 23 is connected to the n-doped layer 17 of a p-n junction of a photodetector. The third circuit 23 allows the recovery of the charges created during an illumination of the p-n junction transmitted by the filter 14. The vertical dots separating two pixels show diagrammatically an electrical separation between the various p-n junctions corresponding to the various pixels of the matrix.

Figure 14:
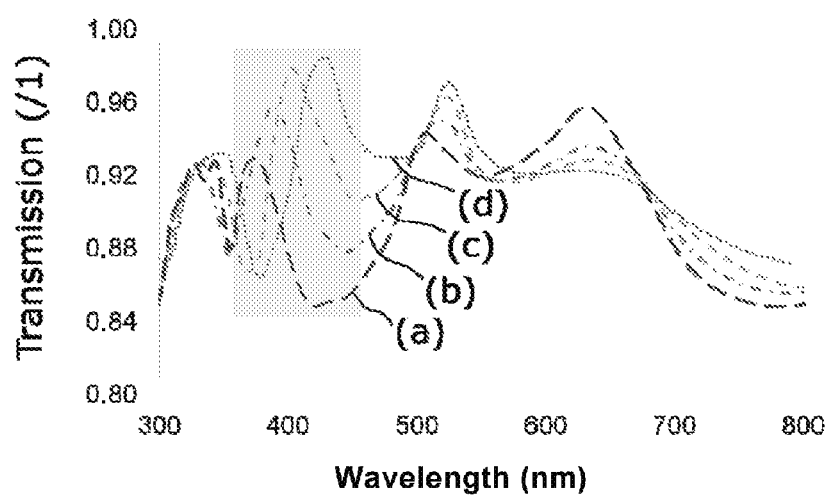
FIG. 14 illustrates a simulation of the optical transmission of a filter according to the invention, as a function of various optical indices of a layer with electrically adjustable optical index

FIG. 14 illustrates a simulation of the optical transmission of a filter 14 according to the invention, as a function of various optical indices of a layer with electrically adjustable optical index 5. The simulation is carried out according to the Finite-Difference Time-Domain (FDTD) procedure. In this procedure, the objects simulated in space are discretized on in a 3-dimensional mesh cell, repeated periodically. The simulated filter 14 comprises cylindrical nano-/microparticles 1 made of silicon, disposed on a silicon plane 22 and separated periodically by a distance of 230 nm. A layer with electrically adjustable optical index 5 is disposed on the plane 22 and on and/or around the nano-/microparticle 1. The simulation illustrated is carried out by considering a mesh cell comprising a plane 22 on the upper surface of a silicon substrate, with a width of 230 nm, a cylindrical nano-/microparticle 1 with a height of 150 nm and a diameter of 160 nm and a layer of layer with electrically adjustable optical index 5 disposed on the surface formed by the nano-/microparticles 1 of a mesh cell and said plane 22. The four curves correspond to simulations parametrized with different optical indices of the layer 5 (curve (a) corresponds to $n_{amb}=1.4$, curve (b) corresponds to $n_{amb}=1.5$, curve (c) corresponds to $n_{amb}=1.6$ and curve (d) corresponds to $n_{amb}=1.7$). The grayed zone corresponds to a wavelength range (for example between 350 and 450 nm) in which the wavelength of a transmission peak of the filter is particularly dependent on the optical index of the layer 5. Thus, for values of the optical index $n_{amb}$ varying from 1.4 to 1.7, the wavelength of the transmission peak in this wavelength range varies from about 370 nm to 450 nm.

Figure 15:
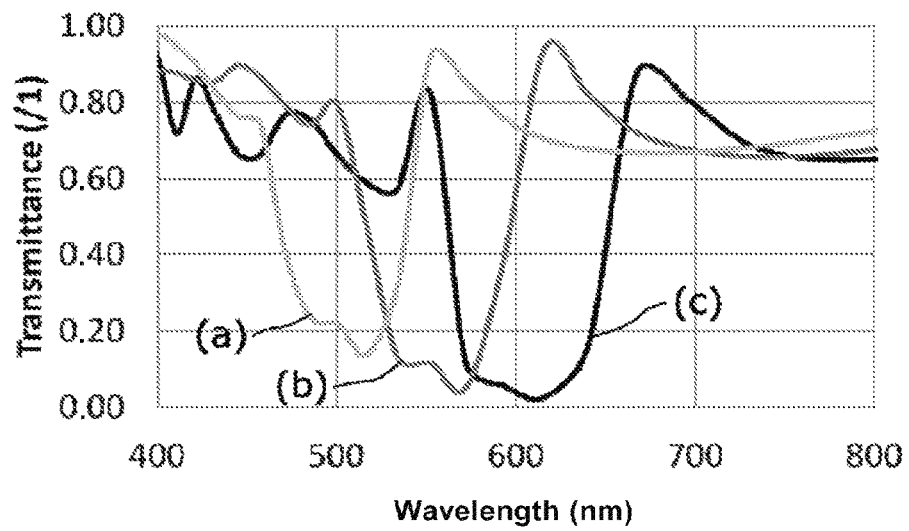
FIG. 15 illustrates simulations of the optical transmission of a different filter of the invention, as a function of the excitation wavelength of the filter.
Figure 15:
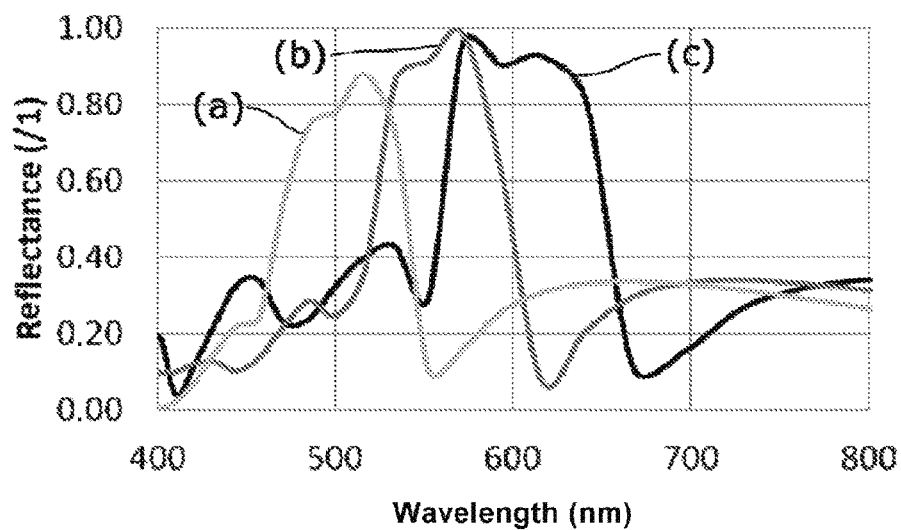

FIG. 15 illustrates simulations of the optical transmittance of a different filter of the invention, as a function of the excitation wavelength of the filter. The simulations are carried out according to the Finite-Difference Time-Domain (FDTD) procedure. In this procedure, the objects simulated in space are discretized on in a 3-dimensional mesh cell, repeated periodically. The simulated filter comprises cylindrical nano-/microparticles 1 made of silicon-germanium disposed on a plane 22. The plane 22 coincides with a second electrically insulating layer 3, made of $SiO_2$ in the case of the simulation. An electrode 7 is disposed above one or more nano-/microparticles 1 and the second electrically insulating layer 3. A silicon layer is disposed below the second electrically insulating layer 3. The simulated nano-/microparticles 1 are substantially hemispherical, the plane part of the hemispheres formed by the nano-/microparticles 1 coinciding with the plane 22, and in the particular case of the simulation with a second electrically insulating layer 3 made of $SiO_2$. Panel A of FIG. 15 illustrates the transmittance of this type of filter. Panel B of FIG. 15 illustrates the reflectance of this type of filter. In panels A and B, curves (a) correspond to a simulation parametrized with a radius r of the hemisphere formed by a nano-/microparticle equal to 80 nm. Curves (b) correspond to a radius of 90 nm and curves (c) correspond to a radius of 100 nm.

The inventors have discovered that in general, the combination of substantially hemispherical nano-microparticles 1 disposed on a second electrically insulating layer 3 whose optical index is less than the optical index of the nano-microparticles 1 makes it possible to produce a wavelength-selective filter. For example, the transmittance is particularly low for wavelengths of between 550 nm and 650 nm in the embodiment illustrated in panel A of FIG. 15. It is possible to use this characteristic in a filter 14 according to the invention, comprising inter alia a layer with electrically adjustable optical index 5 and a first electrically insulating layer 8 disposed on said layer with electrically adjustable optical index 5 in such a way as to produce an electrically adjustable and selective filter. The inventors have furthermore discovered that the selectivity of the filter is optimized when the optical index of the second electrically insulating layer 3 is strictly less than the index of the nano-/microparticle 1. More particularly, the selectivity of the filter is optimized when the ratio of the optical index of the nano-/microparticles 1 to the optical index of a second electrically insulating layer 3 is high, preferably greater than 2. It is thus possible to use $SiO_2$ and/or $TiO_2$ for the production of the second electrically insulating layer 3.

The invention claimed is:

1. An optical filter comprising:
   a plurality of semi-conducting or dielectric nano-/microparticles, exhibiting properties of electromagnetic resonance in the optical and near-infrared domain, arranged on a plane, further comprising:
   a layer with electrically adjustable optical index disposed on the surface formed by said nano-/microparticles and said plane;
   a first electrically insulating layer disposed on said layer with electrically adjustable optical index and
   an electrode disposed on said first electrically insulating layer.

2. The optical filter as claimed in claim 1, comprising a second electrically insulating layer a face of which coincides with said plane, said second electrically insulating layer being in contact with said nano-/microparticles and the layer with electrically adjustable optical index.

3. The optical filter as claimed in claim 1, in which at least one said nano-/microparticle comprises a semi-conducting core and a semi-conducting shell whose electrical properties are different and suitable for forming at least one junction chosen from among an anisotype homojunction, an isotype heterojunction and an anisotype heterojunction.

4. The optical filter as claimed in claim 1, comprising at least one shell of electrically insulating material in which at least one said nano-/microparticle is surrounded, at least partially, by a said shell of electrically insulating material.

5. The optical filter as claimed claim 4, in which at least one material of said layer with electrically adjustable optical index is an organic material.

6. The optical filter as claimed in claim 1, in which the material of said layer with electrically adjustable optical index is chosen at least from among poly(3,4-ethylenedioxythiophene), sodium polystyrene sulfonate, indium-tin oxide, zinc-aluminum oxide, poly(4,4-dioctylcyclopentadithiophene), poly(methyl methacrylate) and networks of carbon nanotubes.

7. The optical filter as claimed in claim 1, the size and the material of said nano-/microparticles of which are suitable for allowing a resonance of said nano-/microparticles for excitation wavelengths of between 300 nm and 2.5 µm.

8. The optical filter as claimed in claim 1, comprising a first electrical circuit connected on the one hand to a ground and on the other hand to said electrode, suitable for the polarization of said layer with electrically adjustable optical index.

9. The optical filter as claimed in claim 2, in which the optical index of the material of said second electrically insulating layer is strictly less than the optical index of the material of said nano-/microparticles and in which said nano-/microparticles are substantially hemispherical, the plane part of the hemispheres formed by said nano-/microparticles coinciding with said plane.

10. A matrix of optical filters as claimed in claim 1.

11. The matrix of optical filters as claimed in claim 8, in which at least two said first circuits are connected so as to impose the same potential between said ground and each said electrode.

12. The matrix of optical filters as claimed in claim 10, in which at least one said first electrical circuit is suitable for imposing a potential independent of said other first electrical circuits, on at least one said electrode.

13. A photodetector with p-n junction, comprising a filter as claimed in claim 1, whose said filter is disposed on a layer chosen from among an n-doped layer and a p-doped layer of said p-n junction.

14. A photodetector comprising an optical filter as claimed in claim 1, the material of whose said layer with electrically adjustable optical index is conducting.

15. The photodetector as claimed in claim 14, comprising a second electrical circuit, two of whose terminals are connected to said layer with electrically adjustable index, said second electrical circuit being suitable for detecting variations of electric current at said terminals.

16. A matrix of said photodetectors as claimed in claim 13.

17. The matrix of photodetectors as claimed in claim 16, in which at least two said first circuits are connected so as to impose the same potential between said ground and each said electrode.

18. The matrix of photodetectors as claimed in claim 16, in which at least one said first electrical circuit is suitable for imposing a potential independent of said other first electrical circuits, on at least one said electrode.

19. A method for the fabrication of a filter as claimed in claim 1, comprising at least the following steps:
   a) dewetting of at least one semi-conducting material layer previously deposited on a said second electrically insulating layer;
   b) deposition of a said layer with electrically adjustable optical index on said semi-conducting and insulating materials.

20. The method as claimed in claim 19, comprising an initial step of etching patterns on said layer of at least one said semi-conducting material, said patterns spatially controlling the formation of said nano-/microparticles during step a).

21. The method as claimed in claim 19, in which at least one said semi-conducting material layer is etched with a focused ion probe.

22. A method for the fabrication of a filter as claimed in claim 1, comprising at least the following steps:
   a) dewetting of at least one semi-conducting material layer previously deposited on a said second electrically insulating layer;
   b) deposition of a said layer with electrically adjustable optical index on said semi-conducting and insulating materials,
   further comprising etching at least said layer with electrically adjustable index so as to spatially define said filter.

23. A method of optical filtering by a filter as claimed in claim 1, said method comprising adjusting the resonance wavelength of said nano-/microparticles by driving the potential on the terminal of said electrode.

* * * * *